Jan. 16, 1951  W. E. GROSS ET AL  2,537,992
GAS MASK CANISTER

Filed March 18, 1939  4 Sheets-Sheet 1

INVENTORS
William E. Gross
Paul O. Rockwell
By M. F. Peake
ATTORNEY

Jan. 16, 1951 W. E. GROSS ET AL 2,537,992
GAS MASK CANISTER
Filed March 18, 1939 4 Sheets-Sheet 2

INVENTORS
William E. Gross
Paul O. Rockwell
By M. F. Peake
ATTORNEY

Jan. 16, 1951  W. E. GROSS ET AL  2,537,992
GAS MASK CANISTER

Filed March 18, 1939  4 Sheets-Sheet 3

INVENTORS
William E. Gross
Paul O. Rockwell
By M. F. Peake
ATTORNEY

Jan. 16, 1951  W. E. GROSS ET AL  2,537,992
GAS MASK CANISTER
Filed March 18, 1939  4 Sheets-Sheet 4

INVENTORS
William E. Gross
Paul O. Rockwell
By M. F. Peake
ATTORNEY

Patented Jan. 16, 1951

2,537,992

UNITED STATES PATENT OFFICE 2,537,992

GAS MASK CANISTER

William E. Gross, Joppa, and Paul O. Rockwell, Baltimore, Md., assignors to the United States of America as represented by the Secretary of War Application March 18, 1939, Serial No. 262,732

4 Claims. (Cl. 183—71)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to improvements in canisters for gas masks and more particularly to the filter used in such canisters. Although the invention is described in connection with gas mask canisters for protection against chemical warfare agents, it is not limited thereto, since it may be used in any type of canister or collective protector.

In all devices for the complete purification of air, it is necessary that an efficient filter be used in order to extract the fine solid particulate matter from the air. An especially effective filter is necessary to make air contaminated by certain agents used in chemical warfare suitable for breathing, since some of these agents are dispersed as extremely fine particles which will easily penetrate ordinary filters. Furthermore, due to the toxic or irritant effect of these particles, complete extraction from the air is necessary.

Since a gas mask canister must usually be carried by the wearer, large and heavy filters may not be used. And, in addition, the resistance to air-flow of such filters must be kept at a minimum, since the efficiency of the wearer of a gas mask is materially lowered by a high breathing resistance.

One object of the present invention is to provide a gas mask canister wherein an efficient filter is provided having low resistance to air-flow.

Another object is to provide a novel arrangement of filter within a gas mask canister such that the over-all dimensions are not increased, and the weight is kept at a minimum.

Another object of this invention is to provide a gas mask canister having a filter as above and in which the parts are capable of quantity production on a large scale.

A further object of this invention is to provide a filter for use in gas mask canisters or collective protectors which has a large surface area due to the provision of a multiplicity of pleats arranged in cylindrical form, with means for firmly securing the filter to the metal canister parts by a mechanical seal.

These and other objects will be apparent from the following description and claims when taken in connection with the accompanying drawings wherein Fig. 1 is a central section of a canister with filter in place.

In general, this invention comprises a novel arrangement of filter and absorbent in a gas mask canister, whereby an annular cylinder of absorbent is placed either within or surrounding a large-area filter of low air resistance. The filter is formed of porous heavy paper which is made up in the shape of a cylinder which is pleated or fluted with the pleats either parallel to the axis of the cylinder or transverse thereto.

Figure 4:
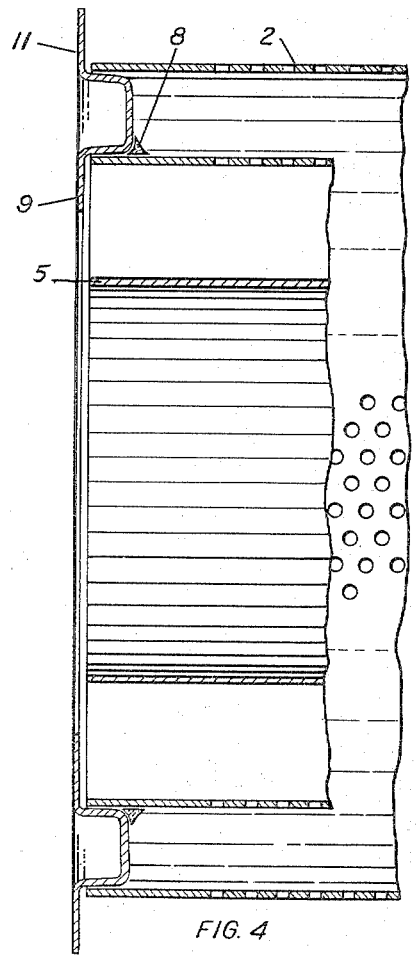
Figs. 4 and 5 are broken side sections before and after the filter is secured in place.
Figure 5:
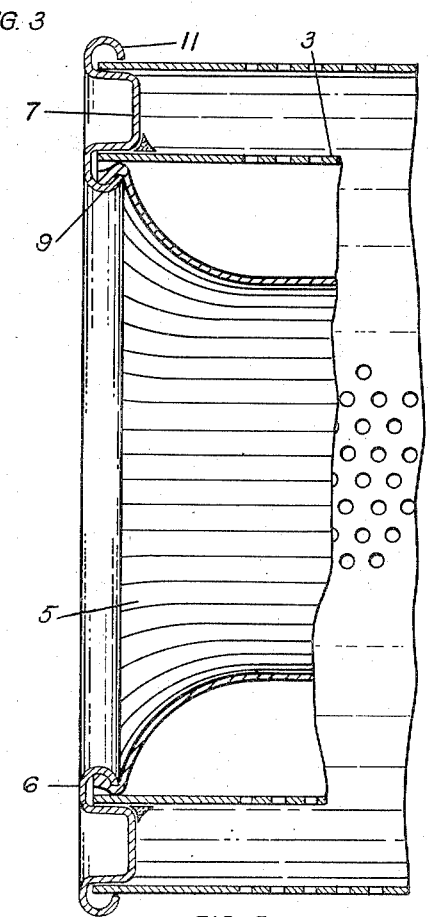

Referring now to Figures 1 to 5, the canister comprises an outer cylindrical sheet metal body 1, and two perforated sheet metal cylinders 2 and 3 secured in concentric relation within outer body 1. Cylinders 2 and 3 are not perforated for a short section at each end, as seen in Figures 4 and 5, for a purpose hereinafter described. The annular space between cylinders 2 and 3 is filled with the chemical absorbent 4 such as activated charcoal and soda lime.

The filter is placed within the inner cylinder 3. This filter 5 is made of porous heavy paper first rolled into a cylinder with the ends overlapped and sealed. This cylinder is then formed into a plurality of longitudinal pleats whereby the diameter of the cylinder is materially reduced. The pleats or folds should be evenly spaced so that air-flow through all folds will be equal. Since the filtering efficiency of the paper is increased by impregnation thereof, the pleated filter is preferably impregnated by passing fine solid particles, preferably less than one micron in diameter and dispersed in air, through the filter. This impregnation may be carried out prior to folding or after assembly in the canister, but better results are had if impregnation is given before folding and after assembly. Finely divided activated charcoal may be used as the impregnant on the filter, as this will assist in retention of smokes precipitated on the filter.

The two heads or closure plates 6 are assembled with the cylinders 2 and 3. Each head 6, as seen in Figure 4, has a channel portion 7 which extends between and spaces cylinders 2 and 3, and also serves to compress the absorbent and thus prevents loosening and channeling of the charcoal. Channel 7 closely fits cylinders 2 and 3, and cylinder 3 is soldered to the channel as at 8, Figure 4. After the pleated filter is in position, the upper and lower edges are folded inwardly as seen in Figure 5, so that the folds lie flat at the edges to be sealed by flanges 9. The folds are open between the top and bottom edges of the cylinder. Flanges 9 are then crimped over the edges of the filter as seen in Figure 5 to securely grip the paper against cylinder 3 and channel 7 and form a tight joint which will not loosen. Flanges 11 are also crimped into engagement with the opposite ends of cylinder 2.

Figure 1:
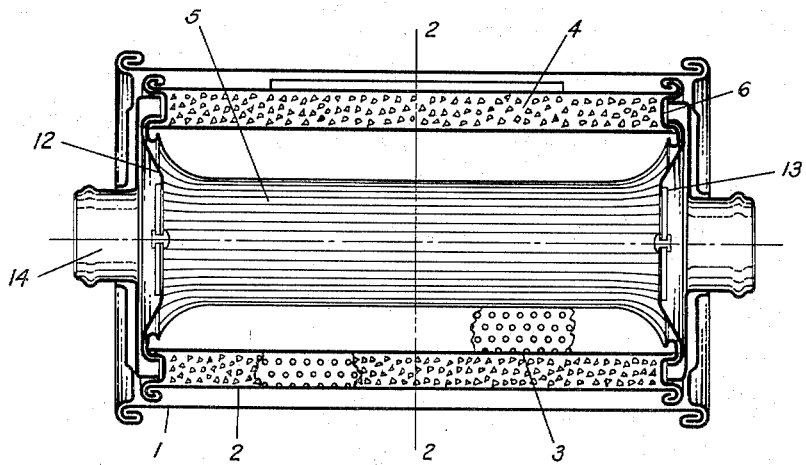
Figure 2:
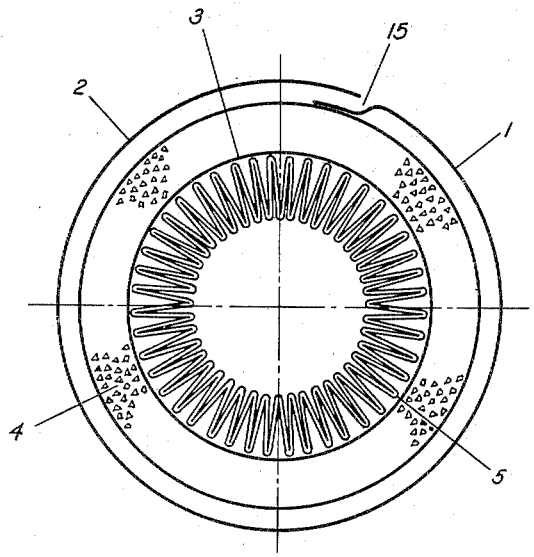
Fig. 2 is a section taken on line 2—2 of Fig. 1.
Figure 3:
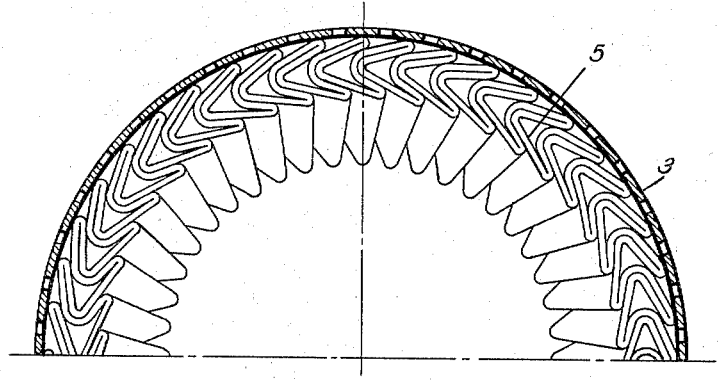
Fig. 3 is a broken top plan of the filter prepared for permanent crimping into the canister.

Assembly of the canister is completed by securing end plates 12, as by soldering to the heads 6, as seen in Figure 1. End plates 12 carry one-way valves 13 which are preferably thin rubber discs secured in their centers on a spider by a rivet or screw connection. Then outlet tubes 14 are secured as by soldering their peripheral flanges to heads 6, and outer body 1 is assembled in any conventional manner.

Outer body 1 is spaced from cylinder 2 to provide a cylindrical air chamber, having an air inlet 15. Inlet 15 is an elongated slit with an overlap portion, so that rain will not enter the canister when the opening faces downwardly. Although the canister may be supported in various ways, one form of support is at the back of a wearer's head, with two inlet tubes connected to outlets 14, and the inlet tubes leading to the interior of the facepiece.

It will be clear that air enters the canister through inlet 15, passes through the perforated cylinders 2 and 3 and the absorbent 4, thence through the folds of filter 5 to the center of the canister, and through one-way valves 13 to outlets 14. The cylinders 2 and 3 are not perforated adjacent each end, to thereby more evenly distribute incoming air through the absorbent and filter. Since the various crimped and soldered joints are airtight, there can be no leakage of contaminated air around the absorbent and filter.

The air-resistance of the canister is very low. This is due in part to the large surface area of the filter, and in part to the arrangement of the absorbent in an annular layer. Prior designs have generally had the absorbent in a single mass whereby all inspired air had to pass through substantially all of the absorbent. In the present design, it has been found that adequate protection is afforded by having the air pass through a relatively thin layer of absorbent, and the air resistance is thereby greatly lowered.

Figure 6:
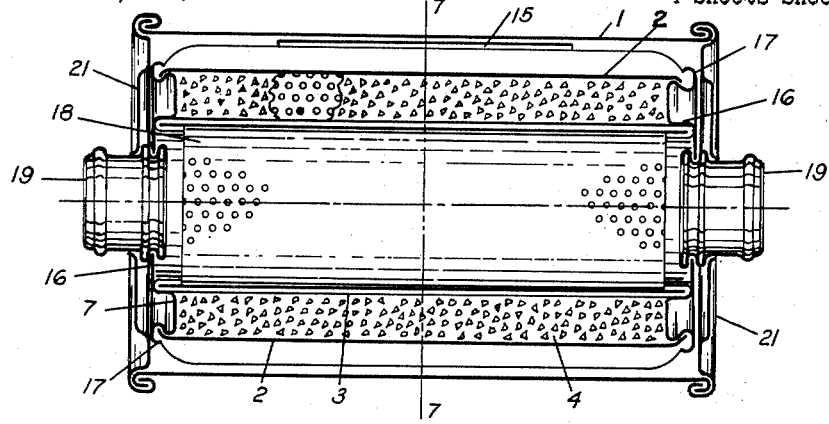
Fig. 6 is a central section of a modified form of canister.
Figure 7:
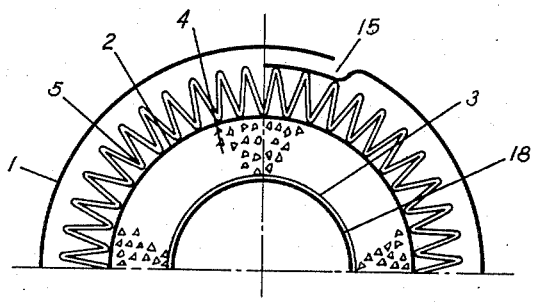
Fig. 7 is a half section on line 7—7 of Fig. 6.

In the modification shown in Figures 6 and 7, the filter is arranged to encircle the absorbent, the arrangement being otherwise generally similar to the form of Figures 1 to 5. The perforated cylinders 2 and 3 within the body 1 retain the absorbent 4 in the form of a cylinder. Channel 7 of the end plates 16 compress the absorbent. End plates 16 have outer flanges 17 which are crimped over the ends of the folder filter 5. In order to prevent finely divided dust particles of the absorbent from being drawn into the facepiece, a dust bag 18 is placed within cylinder 3. This bag is preferably of thin cotton-wool felt and may be secured in position by folding its ends over cylinder 3 prior to assembly of plates 16. The outlet tubes 19 are secured to end plates 16 by crimping or soldering, and covers 21 are also secured to tubes 19.

Figure 8:
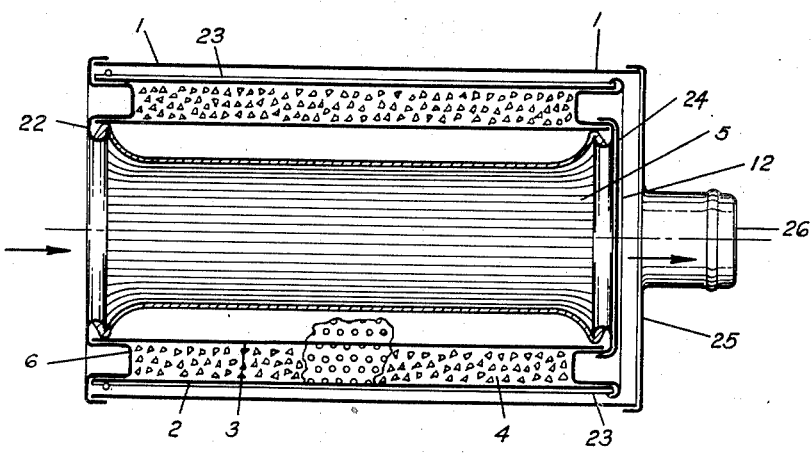
Fig. 8 is a central section of a modification.

In the form shown in Figure 8, air enters one end of the canister and leaves at the other end, as indicated by arrows. The folding of the filter, the arrangement of the filter and absorbent, and the gripping of the ends of the filter are the same as described in connection with Figures 1 to 5. The left hand end plate 22 is secured also to outer body 1, thus eliminating the outer cover at this end of the canister. Outer body 1 does not have a side entrance for air as in the forms described. A dust bag 23 is placed around outer cylinder 2 to catch the fines of the absorbent.

A cap 24 is secured over the right hand end plate, and cover 25 having air outlet tube 26 is secured to outer body 1. Air enters the canister at the left end, passes into the hollow center, thence through filter 5, absorbent 4, filter bag 23, around the end of plate 24 to outlet 26.

Figure 9:
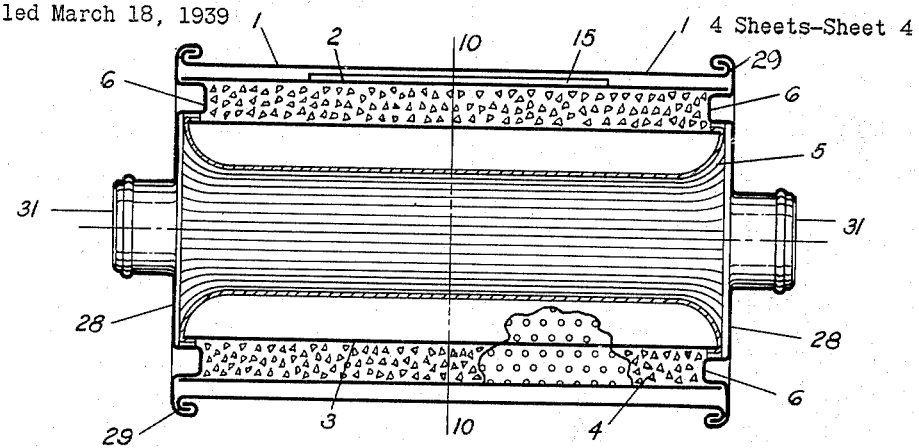
Figs. 9 and 10 are a central section and a section on line 10—10 of Fig. 9, of another modification.
Figure 10:
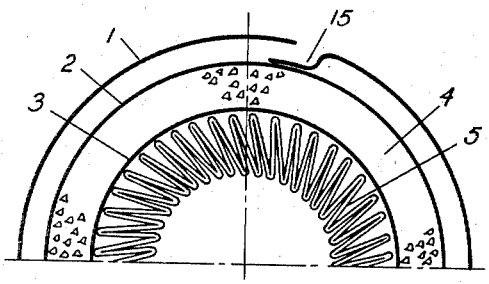
Figure 11:
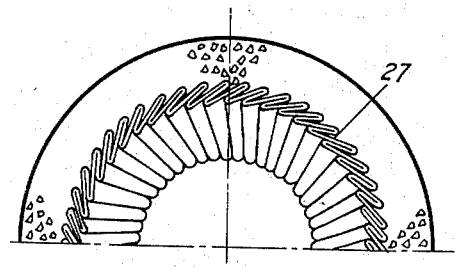
Fig. 11 is an end view of the filter prior to final assembly.

In the form shown in Figures 9 to 11, the pleated filter 5 is secured without crimping the channel flanges over the ends of filter in the manner shown in Fig. 6 as heretofore described. The cylindrical filter is made slightly longer than the perforated cylinder 3. After the filter has been longitudinally folded, the outside corners of the end portions of each fold are trimmed off at about a 45° angle. The filter is then placed in cylinder 3 and the ends of the folds are flattened against the cylinder (see Fig. 11) in any suitable manner such as by rotating a cone having an included angle of approximately 80° against the folded ends of the paper, see Fig. 10. The flat ends of the folds are then spread equally around the inner periphery of cylinder 3, as illustrated by numeral 27, Figure 11. The thickness of the filter is thus substantially uniform at all points where the seal is made. The spaced flat folds are then drawn back or folded over the rim of cylinder 3 (see Fig. 9).

Absorbent 4 is placed between cylinders 2 and 3 and covers 28 are positioned as seen in Figure 9.

The channels 6 of the covers frictionally grip the folded-over edges 27 of filter 5 to form a tight seal. Outer cylinder 2 may be permanently secured to covers 28 as by soldering, and then flanges 29 are crimped over outer body 1. Outlet tubes 31 are formed as part of covers 28. Air inlet 15 is provided in the side of body 1.

Figure 12:
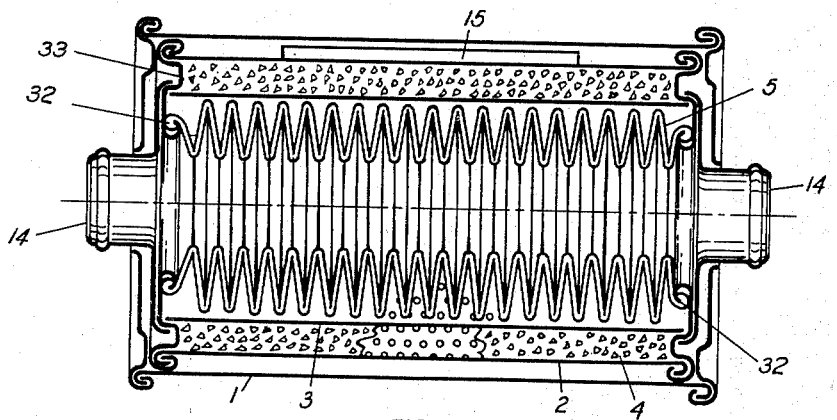
Fig. 12 is a central section of a further modification.

This invention is not limited to filters wherein the folds are pleats are parallel to the longitudinal axis of the cylinder. As seen in Figure 12, the filter is pleated transversely to the axis of the cylinders. In this form, filter 5 is first pleated as shown and then the opposite end leaves are crimped as at 32 by the flanges of end plates 33. The construction is otherwise similar to the form shown in Figures 1 to 5 and need not be described in detail.

Filters for any of the canisters described may be made by folding a strip of suitable materials in a conventional manner. The width and number of folds will depend upon the diameter of the inner cylinder thickness of filter material, etc. Also, the filters of Fig. 12 may be formed from a multiplicity of annular rings glued or otherwise sealed at thier inner and outer rims to one another.

One of the advantages of providing a relatively thin layer of the absorbent around a filter or encircled by a filter is the reduction in size and resistance of the canister without loss of its protective capacity. The preferred absorbent for such a canister is activated charcoal of approximately 12 to 30 sieve size. The perforated cylinders holding the charcoal must be maintained perfectly concentric so that the thickness of the absorbent layer is constant throughout. These cylinders need not be round, since oval or even flat sided cylinders may be used, such as triangular, rectangular, or other multiple-sided figures. Preferably the filter will have the same configuration as the cylinders. In the accompanying claims it will be understood that reference to the cylinders, mass of absorbent, and filter as tubular is intended to cover various shapes and is not limited to cylindrical shapes.

We claim:

1. In a canister through which purified air is passed, a pleated, tubular filter arranged within the canister in the path of all air passing therethrough, characterized by having a circular, pleated wall the edges of which, intermediate of the ends of the filter, are substantially parallel to the longitudinal axis of the filter, said filter also having at least one pleated, outwardly curved end portion having its pleats biased in overlapping relation to provide flared terminals for the filter and to facilitate crimping said terminals when securing the filter in fixed position within said canister.

2. In a canister through which purified air is passed, having closure plates at opposite ends thereof, an elongated, circular, pleated filter deposited between and clampingly secured to said plates and being curved and flared outwardly and biased in overlapping relation at its end portions; said closure plates having crimped flanges crimped and engaging said end portions to provide tightly sealed joints between said closure plates and said end portions.

3. In a canister through which purified air is passed, an elongated, tubular, pleated filter, substantially circular in cross-section and arranged within the canister in the path of all air passing there-through, the pleats of said filter, intermediate of its end portions, being so folded that lines bisecting the angle formed by said pleats are substantially radial with respect to the longitudinal axis of the filter, the end portions having their pleats flared and curved outwardly and nested within the canister to streamline the end portions of the filter and to facilitate the clamping of the filter within said canister.

4. In a canister through which purified air is passed, having closure plates at its opposite ends in fixed position, an elongated, circular, tubular, pleated paper filter flared and curved outwardly at either end, and fixedly secured between said plates and having its central portion held substantially perpendicular to said plates, said filter being flared outwardly at each of its end portions with the pleats of the filter in said end portions creased longitudinally in a direction parallel to a central axis of said filter and nested against the closure plates, said closure plates having peripheral flange portions in engagement with the creased, nested end portions and securing said closure plates and the flared end portions of the filter together in a substantially airtight manner.

WILLIAM E. GROSS.
PAUL O. ROCKWELL.

REFERENCES CITED

The following references are of record in the file of this patent:

UNITED STATES PATENTS

| Number | Name | Date |
| --- | --- | --- |
| 1,896,395 | Dooley | Feb. 7, 1933 |
| 2,002,936 | Davies | May 28, 1935 |
| 2,063,990 | Dym | Dec. 15, 1936 |
| 2,122,111 | Poelman et al. | June 28, 1938 |
| 2,174,528 | Prentiss | Oct. 3, 1939 |

FOREIGN PATENTS

| Number | Country | Date |
| --- | --- | --- |
| 426,298 | Great Britain | Apr. 1, 1935 |
| 833,601 | France | Oct. 26, 1938 |